United States Patent
Edwards et al.

(10) Patent No.: US 10,788,049 B1
(45) Date of Patent: Sep. 29, 2020

(54) GAS TURBINE ENGINE AIRFOIL FREQUENCY DESIGN

(71) Applicant: UNITED TECHNOLOGIES CORPORATION, Farmington, CT (US)

(72) Inventors: William R. Edwards, Stratham, NH (US); Stephen W. Milks, Sanford, ME (US); Steven J. Feigleson, Waverly Hall, GA (US); Mark A. Stephens, Wethersfield, CT (US); Joseph C. Straccia, Erie, CO (US)

(73) Assignee: Raytheon Technologies Corporation, Farmington, CT (US)

( * ) Notice: Subject to any disclaimer, the term of this patent is extended or adjusted under 35 U.S.C. 154(b) by 82 days.

(21) Appl. No.: 15/871,347

(22) Filed: Jan. 15, 2018

Related U.S. Application Data

(60) Provisional application No. 62/446,901, filed on Jan. 17, 2017.

(51) Int. Cl.
*F02K 3/06* (2006.01)
*F04D 29/54* (2006.01)
(Continued)

(52) U.S. Cl.
CPC .............. *F04D 29/544* (2013.01); *F02K 3/06* (2013.01); *F04D 29/023* (2013.01);
(Continued)

(58) Field of Classification Search
None
See application file for complete search history.

(56) References Cited

U.S. PATENT DOCUMENTS

| 3,367,629 | A | * | 2/1968 | Partington | .............. F01D 5/225 416/190 |
| 3,588,278 | A | * | 6/1971 | Saratoga et al. | ........ F01D 5/225 416/190 |

(Continued)

OTHER PUBLICATIONS

FAA, Advisory Circular No. 33.83-1: Comparative Method to Equivalent Vibratory Stresses and High Cycle Capability for Parts Manufacturer Approval of Turbine Engine and Auxiliary Power Unit Parts, 9/8/9 (Year: 2009).*

(Continued)

*Primary Examiner* — Aaron R Eastman
*Assistant Examiner* — Theodore C Ribadeneyra
(74) *Attorney, Agent, or Firm* — Carlson, Gaskey & Olds, P.C.

(57) ABSTRACT

A turbomachine airfoil element includes an airfoil that has pressure and suction sides spaced apart from one another in a thickness direction and joined to one another at leading and trailing edges. The airfoil extends in a radial direction a span that is in a range of 2.59-2.89 inch (65.7-73.3 mm). A chord length extends in a chordwise direction from the leading edge to the trailing edge at 50% span and is in a range of 1.46-1.76 inch (37.1-44.7 mm). The airfoil element includes at least two of a first mode with a frequency of 703±10% Hz, a second mode with a frequency of 3574±10% Hz, a third mode with a frequency of 8100±10% Hz, a fourth mode with a frequency of 9450±10% Hz, a fifth mode with a frequency of 11116±10% Hz and a sixth mode with a frequency of 11620±10% Hz.

6 Claims, 7 Drawing Sheets

(51) Int. Cl.
*F04D 29/02* (2006.01)
*F04D 29/66* (2006.01)

(52) U.S. Cl.
CPC ........ *F04D 29/668* (2013.01); *F05D 2220/32* (2013.01); *F05D 2230/80* (2013.01); *F05D 2240/35* (2013.01); *F05D 2260/96* (2013.01); *F05D 2300/173* (2013.01); *F05D 2300/501* (2013.01); *F05D 2300/522* (2013.01)

(56) References Cited

U.S. PATENT DOCUMENTS

| | | | | |
|---|---|---|---|---|
| 3,847,506 A * | 11/1974 | Straniti | ............... | F01D 5/08 416/244 R |
| 4,839,245 A * | 6/1989 | Sue | ............... | C23C 14/0021 29/DIG. 45 |
| 5,988,982 A * | 11/1999 | Clauer | ............... | C21D 10/005 219/121.62 |
| 6,004,101 A * | 12/1999 | Schilling | ............... | F01D 5/28 416/219 R |
| 6,814,543 B2 * | 11/2004 | Barb | ............... | F01D 5/141 416/1 |
| 8,863,491 B2 * | 10/2014 | Merry | ............... | F01D 25/162 60/39.163 |
| 9,133,720 B2 * | 9/2015 | Suciu | ............... | F01D 5/084 |
| 9,394,793 B1 | 7/2016 | Atkins et al. | | |
| 2004/0198852 A1 * | 10/2004 | Lin | ............... | C08G 18/10 521/54 |
| 2005/0265888 A1 * | 12/2005 | Liang | ............... | C22C 5/04 420/457 |
| 2010/0239422 A1 * | 9/2010 | Reyes | ............... | F01D 5/26 416/204 A |
| 2012/0308381 A1 * | 12/2012 | Suciu | ............... | F01D 5/084 415/220 |
| 2012/0308390 A1 * | 12/2012 | Asai | ............... | F01D 5/28 416/204 R |
| 2013/0259652 A1 * | 10/2013 | Kupratis | ............... | F02C 7/36 415/122.1 |
| 2015/0089809 A1 * | 4/2015 | Guo | ............... | B23P 15/02 29/889.7 |
| 2015/0113943 A1 * | 4/2015 | Schwarz | ............... | F01D 1/26 60/226.1 |
| 2015/0114002 A1 * | 4/2015 | Schwarz | ............... | F01D 25/16 60/792 |
| 2015/0198047 A1 * | 7/2015 | Roche | ............... | F01D 5/16 60/805 |
| 2015/0285085 A1 * | 10/2015 | Bentley | ............... | F01D 5/143 415/208.1 |
| 2016/0024971 A1 * | 1/2016 | Pearce | ............... | F01D 9/041 415/208.1 |
| 2016/0025003 A1 * | 1/2016 | Schwarz | ............... | F01D 25/16 415/69 |
| 2018/0299477 A1 * | 10/2018 | Topol | ............... | G01P 3/48 |

OTHER PUBLICATIONS

Jaiswal and Joshi, Design and Analysis of Stator, Rotor and Blades of the Axial flow Compressor, 2013. International Journal of Engineering Development and Research (Year: 2013).*

ASM, Aluminum 7075-T6, Metals Handbook, vol. 2—Properties and Selection: Nonferrous Alloys and Special-Purpose Materials, ASM International 10th Ed. 1990 (Year: 1990).*

* cited by examiner

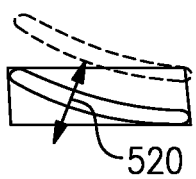
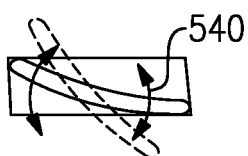
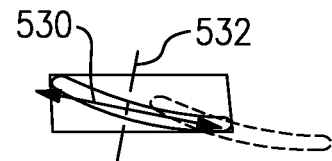
FIG.6B (EB1 MODE)     FIG.7B (T MODE)     FIG.8B (SWB1 MODE)
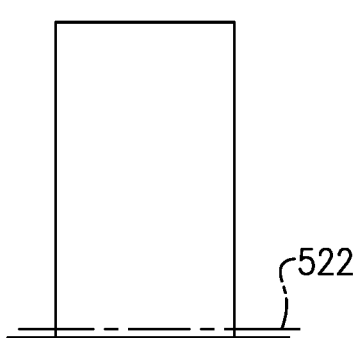
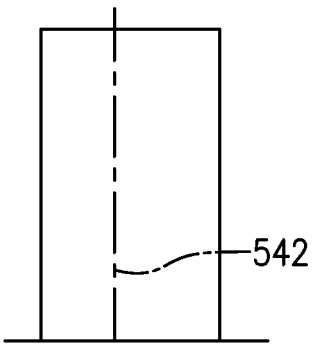
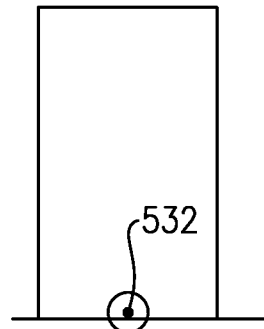
FIG.6A (EB1 MODE)     FIG.7A (T MODE)     FIG.8A (SWB1 MODE)
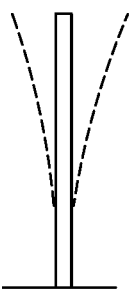
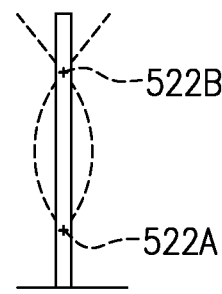
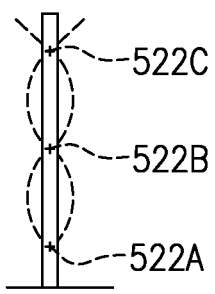
FIG.6C (EB1 MODE)     FIG.6D (EB2 MODE)     FIG.6E (EB3 MODE)

GAS TURBINE ENGINE AIRFOIL FREQUENCY DESIGN

CROSS REFERENCE TO RELATED APPLICATIONS

This application claims priority to U.S. Provisional Application No. 62/446,901, filed on Jan. 17, 2017.

BACKGROUND

The disclosure relates to turbomachinery. More particularly, the disclosure relates to gas turbine engine airfoils and their designed vibrational responses.

Airfoils of turbine engine blades and vanes are subject to a number of performance-affecting conditions. The airfoils are subject to environmental exposure and thermal and mechanical loading. These factors are significant in each section of the engine for a variety of reasons. For example, in the fan section of high bypass engines, the airfoils have a large diameter with a relatively small thickness. In a high pressure compressor and in a turbine section, the airfoil is exposed to high temperatures. Cooling passages are provided in the turbine section airfoils, but such cooling passages are typically absent in the compressor section. For blades, rotational forces are also a significant dynamic stimulus.

Vibrational responses of the airfoil can provide an indication of how durable the airfoil will be during engine operation. If an airfoil operates too long at a resonant frequency during engine operation, the life of the airfoil may be significantly shortened as the airfoil is more highly stressed. An exemplary vibrational testing method is defined in United States Federal Aviation Administration (FAA) Advisory Circular 38.83-1 (Sep. 8, 2009). Designing airfoils with desirable resonant frequencies can prolong the useful life of engine components, particularly the airfoil itself.

SUMMARY

In one exemplary embodiment, a turbomachine airfoil element includes an airfoil that has pressure and suction sides spaced apart from one another in a thickness direction and joined to one another at leading and trailing edges. The airfoil extends in a radial direction a span that is in a range of 2.59-2.89 inch (65.7-73.3 mm). A chord length extends in a chordwise direction from the leading edge to the trailing edge at 50% span and is in a range of 1.46-1.76 inch (37.1-44.7 mm). The airfoil element includes at least two of a first mode with a frequency of 703±10% Hz, a second mode with a frequency of 3574±10% Hz, a third mode with a frequency of 8100±10% Hz, a fourth mode with a frequency of 9450±10% Hz, a fifth mode with a frequency of 11116±10% Hz and a sixth mode with a frequency of 11620±10% Hz.

In a further embodiment of the above, three of the first, second, third, fourth, fifth and sixth mode frequencies are present.

In a further embodiment of any of the above, the first mode is a 1EB mode. The second mode is a 1EB/1T mode. The third mode is a 2T mode. The fourth mode is a 4EBTE. The fifth mode is a 1CWB mode and the sixth mode is a 2CWB mode.

In a further embodiment of any of the above, the 1EB and 4EBTE mode corresponds to deflections substantially parallel to thickness direction. The 1T and 2T modes correspond to twisting about the radial direction. The CWB modes correspond to bending that is substantially normal to the thickness direction and substantially along the chordwise direction.

In a further embodiment of any of the above, the frequencies are at zero speed and ambient conditions.

In a further embodiment of any of the above, at a running speed/condition the first mode has a frequency of 682±10% Hz, the second mode has a frequency of 3468±10% Hz, the third mode has a frequency of 7860±10% Hz, the fourth mode has a frequency of 9169±10% Hz, the fifth mode has a frequency of 10786±10% Hz and the sixth mode has a frequency of 11275±10% Hz.

In a further embodiment of any of the above, the frequencies are within ±5% ranges.

In a further embodiment of any of the above, the airfoil element is part of a stator vane having opposing ends supported by potting.

In a further embodiment of any of the above, the airfoil is an aluminum-based alloy.

In a further embodiment of any of the above, the aluminum-based alloy has a density of about 0.103 lb/in$^3$ (2.85 g/cm$^3$).

In a further embodiment of any of the above, the aluminum-based alloy has a modulus of elasticity of about 10.4 Mpsi (71 GPa) at room temperature.

In another exemplary embodiment, a method of repairing an airfoil includes the steps of providing an airfoil that has pressure and suction sides spaced apart from one another in a thickness direction and joined to one another at leading and trailing edges. The airfoil extends in a radial direction a span that is in a range of 2.59-2.89 inch (65.7-73.3 mm). A chord length extends in a chordwise direction from the leading edge to the trailing edge at 50% span and is in a range of 1.46-1.76 inch (37.1-44.7 mm). The provided airfoil has at least one unrestored mode frequency that is attributable to damage to the airfoil and repairing the airfoil to provide at least one of a first mode has a frequency of 703±10% Hz, a second mode resonance frequency is 3574±10% Hz, a third mode has a frequency of 8100±10% Hz, a fourth mode has a frequency of 9450±10% Hz, a fifth mode has a frequency of 11116±10% Hz and a sixth mode has a frequency of 11620±10% Hz. At least one of the first mode frequency, second mode frequency, third mode frequency, fourth mode frequency, fifth mode frequency, and sixth mode frequency corresponds to a restored mode frequency that supersedes the unrestored mode frequency.

In a further embodiment of any of the above, the first mode is a 1EB mode, the second mode is a 1EB/1T mode, the third mode is a 2T mode, the fourth mode is a 4EBTE, the fifth mode is a 1CWB mode, and the sixth mode is a 2CWB mode. The frequencies are at zero speed and ambient conditions and the airfoil is an aluminum-based alloy.

In another exemplary embodiment, a turbofan engine includes a fan section and a compressor section arranged fluidly downstream from the fan section. A turbine section is arranged fluidly downstream from the compressor section. A combustor is arranged fluidly between the compressor and turbine sections. An airfoil is in at least one of the fan, compressor and turbine sections. The airfoil has pressure and suction sides spaced apart from one another in a thickness direction and joined to one another at leading and trailing edges. The airfoil extends in a radial direction a span that is in a range of 2.59-2.89 inch (65.7-73.3 mm.). A chord length extends in a chordwise direction from the leading edge to the trailing edge at 50% span and is in a range of 1.46-1.76 inch (37.1-44.7 mm). At least two of a first mode has a frequency of 703±10% Hz, a second mode has a frequency of 3574±10% Hz, a third mode has a frequency of 8100±10% Hz, a fourth mode has a frequency of 9450±10% Hz, a fifth mode has a frequency of 11116±10% Hz and a sixth mode has a frequency of 11620±10% Hz.

In a further embodiment of any of the above, the airfoil is provided in the compressor section.

In a further embodiment of any of the above, the compressor section includes a high pressure compressor fluidly downstream from a low pressure compressor. The airfoil is in the low pressure compressor.

In a further embodiment of any of the above, the airfoil element is part of a stator and the stator is a stator vane having opposing ends supported by potting.

In a further embodiment of any of the above, the low pressure compressor includes three stages In a further embodiment of any of the above, the airfoil is an aluminum-based alloy with a density of about 0.103 lb/in³ (2.85 g/cm³) and with a modulus of elasticity of about 10.4 Mpsi (71 GPa) at room temperature.

In a further embodiment of any of the above, the first mode is a 1EB mode. The second mode is a 1EB/1T mode. The third mode is a 2T mode. The fourth mode is a 4EBTE. The fifth mode is a 1CWB mode and the sixth mode is a 2CWB mode. The 1EB and 4EBTE mode corresponds to deflections substantially parallel to thickness direction. The 1T and 2T modes correspond to twisting about the radial direction. The CWB modes correspond to bending that is substantially normal to the thickness direction and substantially along the chordwise direction.

BRIEF DESCRIPTION OF THE DRAWINGS

The disclosure can be further understood by reference to the following detailed description when considered in connection with the accompanying drawings wherein:

FIG. 6A is a schematic side view of an airfoil showing a first easywise bending mode node line.

FIG. 6B is an inward view of the airfoil of FIG. 6A with one vibrational extreme shown in broken lines.

FIG. 6C is a front view of the airfoil of FIG. 6A with both vibrational extremes shown in broken lines.

FIG. 6D is a front view of an airfoil with second easywise bending mode extremes shown in broken lines.

FIG. 6E is a front view of an airfoil with third easywise bending mode extremes shown in broken lines.

FIG. 7A is a side view of an airfoil showing a torsion mode node line.

FIG. 7B is an inward view of the airfoil of FIG. 7A, with one torsional extreme shown in broken lines.

FIG. 8A is a side view of an airfoil showing a first stiffwise bending mode node line.

FIG. 8B is an inward view of the airfoil of FIG. 8A with a rearward vibrational extreme shown in broken lines.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible. Like reference numbers and designations in the various drawings indicate like elements.

DETAILED DESCRIPTION

Figure 11:
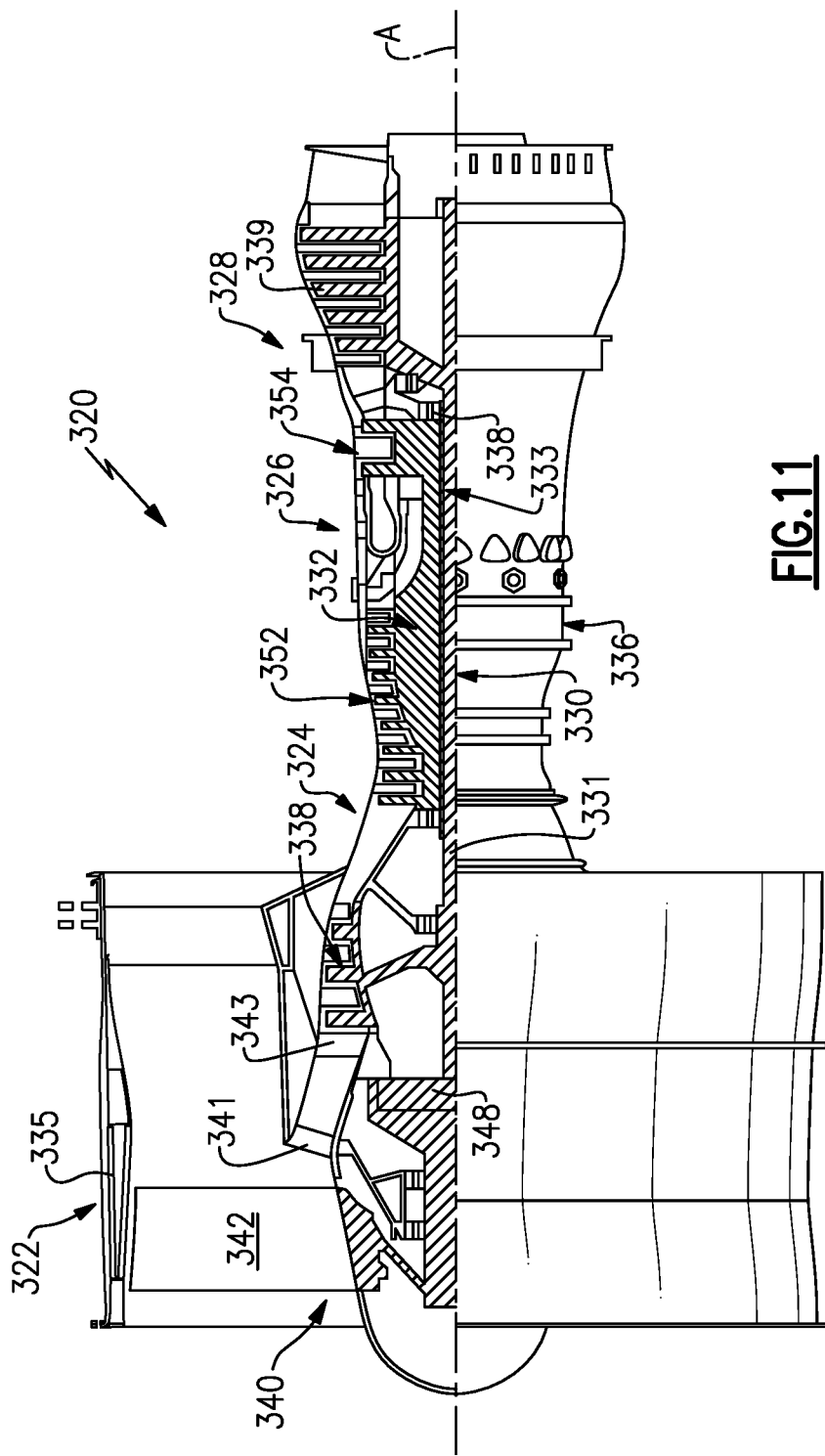
FIG. 11 is a schematic sectional view of a turbofan engine.

FIG. 11 schematically illustrates a gas turbine engine 320. The exemplary gas turbine engine 320 is a two-spool turbofan engine that generally incorporates a fan section 322, a compressor section 324, a combustor section 326 and a turbine section 328. Alternative engines might include an augmenter section (not shown) among other systems or features. The fan section 322 drives an inlet airflow to split with a bypass portion being driven along an outboard bypass flow path, while the core portion is further driven by a compressor section 324 along a core flow path for compression and communication into the combustor section 326. The hot combustion gases generated in the combustor section 326 are expanded through the turbine section 328. Although depicted as a turbofan gas turbine engine in the disclosed non-limiting embodiment, it should be understood that the concepts described herein are not limited to turbofan engines and these teachings could extend to other types of engines, including but not limited to, geared turbine engines having a geared architecture 348, three-spool engine architectures, and ground-based engines.

The exemplary fan section comprises a fan case 335 surrounding a fan 340 which comprises a circumferential array of fan blades 342. In the exemplary two-spool engine, the low pressure spool 330 comprises a shaft 331 rotatable about axis A joining a first (or low) pressure compressor (LPC) section 338 to a first (or low) pressure turbine (LPT) section 339. Similarly, a second (or high) speed spool 332 comprises a shaft 333 rotatable about axis A coupling a second (or high) pressure compressor section 352 to the high pressure turbine section 354.

The core airflow is compressed by the low pressure compressor 338 then the high pressure compressor 352, mixed and burned with fuel in the combustor 326, then expanded over the high pressure turbine 354 and low pressure turbine 339. The turbines 354, 339 rotationally drive the respective low speed spool 330 and high speed spool 332 in response to the expansion. It will be appreciated that each of the positions of the fan section 322, compressor section 324, combustor section 326, turbine section 328, and fan drive gear system 348 may be varied. For example, gear system 348 may be located aft of combustor section 326 or even aft of turbine section 328, and fan section 322 may be positioned forward or aft of the location of gear system 348.

In a non-limiting embodiment, the FIG. 11 gas turbine engine 320 is a high-bypass geared aircraft engine. In a further example, the gas turbine engine 320 bypass ratio is greater than about six (6:1). The geared architecture 348 can include an epicyclic gear train, such as a planetary gear system or other gear system. The example epicyclic gear train has a gear reduction ratio of greater than about 2.3:1, and in another example is greater than about 2.5:1. The exemplary geared architecture transmits driving torque from the low pressure spool to the fan with a geared reduction. The geared turbofan enables operation of the low speed spool 330 at higher speeds, which can increase the operational efficiency of the low pressure compressor 338 and low pressure turbine 339 and render increased pressure in a fewer number of stages. It should be understood, however, that the above parameters are only exemplary of one embodiment of a geared architecture engine and that the present invention is applicable to other gas turbine engines including direct drive turbofans.

In one non-limiting embodiment, the bypass ratio of the gas turbine engine 320 is greater than about ten (10:1), the fan diameter is significantly larger than that of the low pressure compressor 338, and the low pressure turbine 339 has a pressure ratio that is greater than about five (5:1). Low pressure turbine pressure ratio is pressure measured prior to inlet of low pressure turbine 339 as related to the pressure at the outlet of the low pressure turbine 339 prior to an exhaust nozzle. It should be understood, however, that the above parameters are only exemplary of one embodiment of a geared architecture engine and that the present disclosure is applicable to other gas turbine engines, including direct drive turbofans.

In this embodiment of the exemplary gas turbine engine 320, a significant amount of thrust is provided by the bypass flow path B due to the high bypass ratio. The fan section 322 of the gas turbine engine 320 is designed for a particular flight condition—typically cruise at about 0.8 Mach and about 35,000 feet. This flight condition, with the gas turbine engine 320 at its best fuel consumption, is also known as bucket cruise thrust specific fuel consumption (TSFC). TSFC is an industry standard parameter of fuel consumption per unit of thrust the engine produces at that minimum point.

Fan pressure ratio (FPR) is the pressure ratio across an airfoil of the fan section 322 without the use of a fan exit guide vane (FEGV) system. The low fan pressure ratio according to one non-limiting embodiment of the example gas turbine engine 320 is less than 1.45. Low corrected fan tip speed (LCFTS) is the actual fan tip speed divided by an industry standard temperature correction of [(Tram ° R)/(518.7° R)$^{0.5}$. The low corrected fan tip speed according to one non-limiting embodiment of the example gas turbine engine 320 is less than about 1150 fps (350 m/s).

Figure 1A:
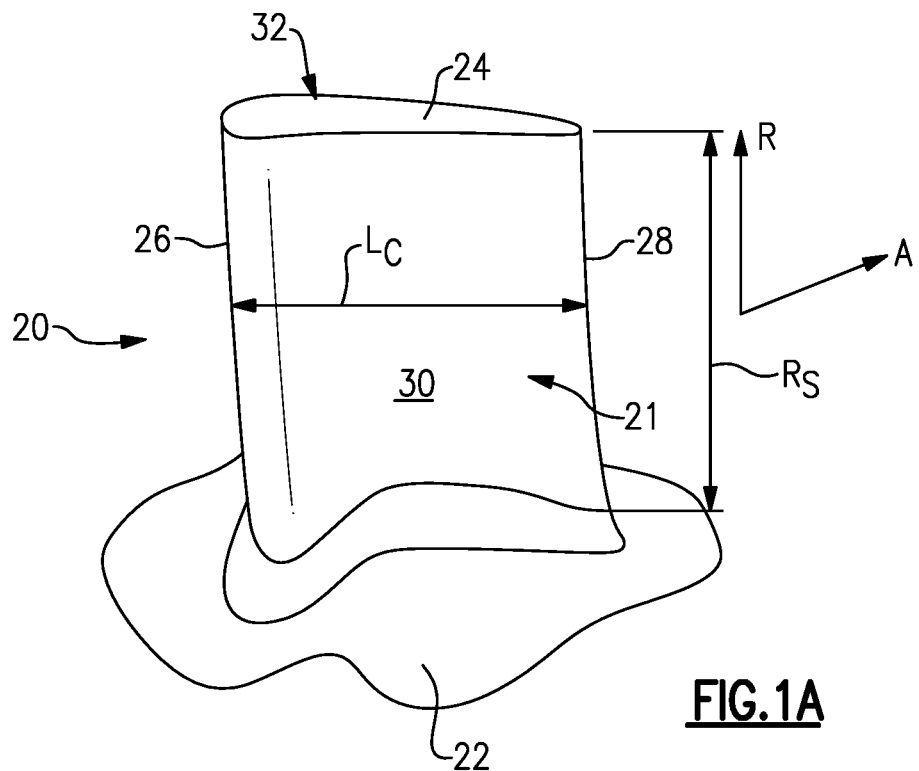
FIG. 1A is a view of a perspective view of an example airfoil element.
Figure 1B:
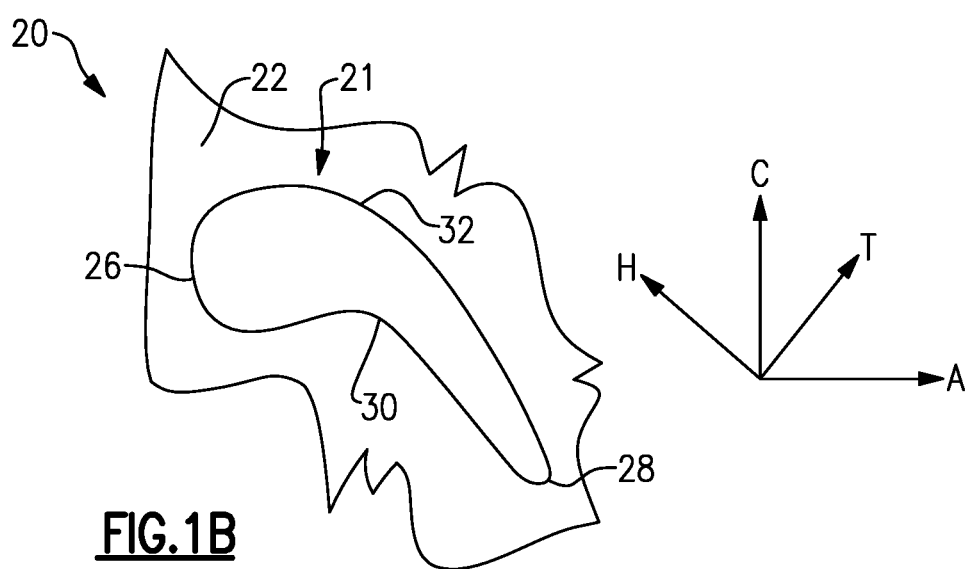
FIG. 1B is top view of the airfoil of FIG. 1A.

Airfoils are used throughout the fan, compressor and turbine sections 340, 338, 328 within the bypass and core flow paths. The airfoils can be supported relative to the engine static structure 336 or spools using a variety of techniques. Turning now to FIGS. 1A-1B, an engine airfoil element 20, for example, a blade or a vane, extends in a radial direction R, or spanwise, from at least one flow path surface 22, for example, a platform or a shroud, to, for example, a tip 24 or a shroud. The airfoil element 20 includes an airfoil 21 having leading and trailing edges 26, 28 spaced apart in a chord-wise direction H. In the case of a blade, the tip 24 is arranged adjacent to a blade outer air seal.

The airfoil 21 includes pressure (typically concave) and suction (typically convex) sides 30, 32 spaced apart in an airfoil thickness direction T, generally perpendicular to the chord-wise direction H, that are joined at the leading and trailing edges 26, 28. Multiple airfoils 21 are arranged circumferentially in a circumferential direction C in an array.

As shown in FIG. 1A, the airfoil 20 has a radial span RS and a chord length LC. An inner or outer platform or a shroud may be provided at one or both radial extremities of the airfoil 20, depending upon the application (see, e.g., FIGS. 3-5C). RS may be defined as the minimum radial distance between the radially outboard-most portion of airfoil 20, which may be the tip 24 in the case of a blade, to the radially inboard-most portion of the airfoil 20. The radially inboard- or outboard-most portion may be an end supported by elastomeric potting material and an inner or outer ring, or a vane having an integral inner or outer shroud. Alternatively, both ends of the airfoil may be supported in radially spaced rings by potting. RS may be defined as excluding any fillet that adjoins the airfoil's aerodynamic exterior surface to any inner or outer platform or shroud. LC may be defined as the distance from the leading edge 26 to the trailing edge 28 at about 50% span. For example, RS is 2.59-2.89 inch (65.7-73.3 mm) and LC is 1.46-1.76 inch (37.1-44.7 mm). In one example, the airfoils 20 in the array may be configured to provide an asymmetry to reduce undesired vibrations, for example, by arranging airfoils slightly different geometries in a circumferentially alternating pattern. In one example, first and second sets of airfoils are interleaved with one set of airfoils having an Lc that is less the Lc of the other set of airfoils by 0.001 inch (0.03 mm) or less.

Figure 2:
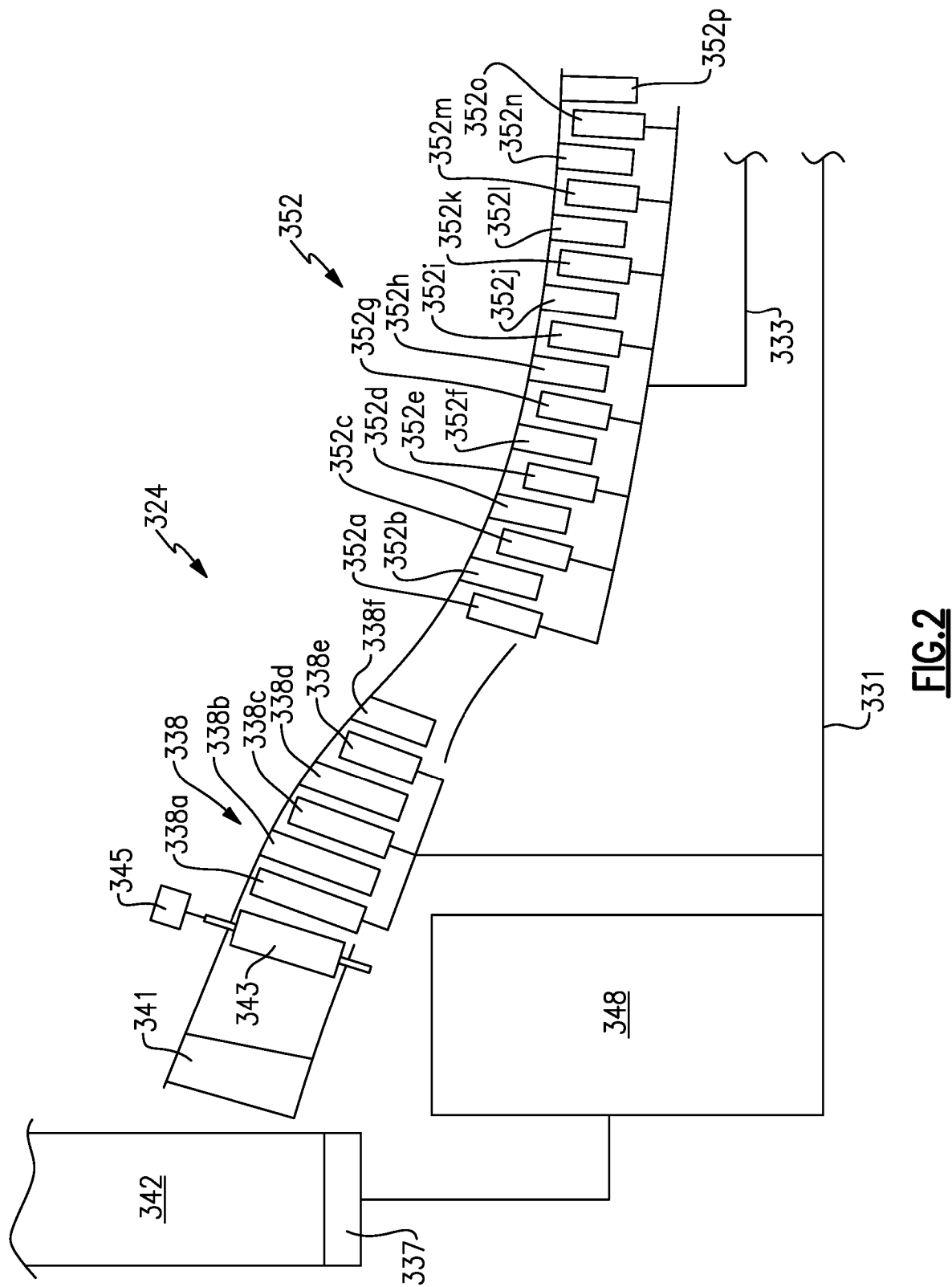
FIG. 2 is a schematic sectional view of a fan section, a low pressure compressor and a high pressure compressor of an example turbofan engine.

FIG. 2 schematically illustrates one example fan section 340 and compressor section 324 in more detail. An array of fan exit stator (FES) 341 are provided at an inlet of the core flow path downstream from the fan 342. Variable inlet guide vanes (IGV) 343, adjustable using actuators 345, are arranged fluidly between the FESs 341 and the LPC 338. In the disclosed example, the LPC 338 has three stages of alternating arrays of rotating blades (338a, 338c, 338e) and fixed stator vanes (338b, 338d, 338f), and the HPC 352 has eight stages of alternating arrays of rotating blades (352a, 352c, 352e, 352g, 352i, 352k, 352m, 352o) and fixed stator vanes (352b, 352d, 352f, 352h, 352j, 3521, 352n, 352p). A different number of stages or a different configuration of blades and vanes can be used if desired.

Figure 3:
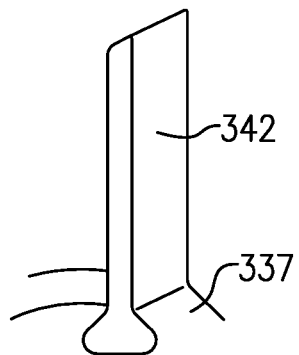
FIG. 3 is a schematic perspective view of an example fan blade and a portion of a fan hub.
Figure 4B:
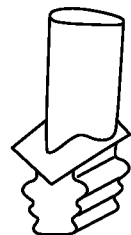
FIG. 4B is a schematic perspective view of a compressor blade airfoil with a root.
Figure 4A:
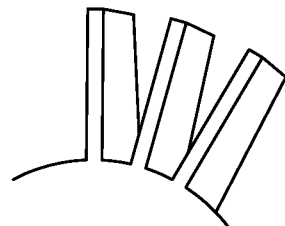
FIG. 4A is a schematic perspective view of an integrally bladed rotor.
Figure 5A:
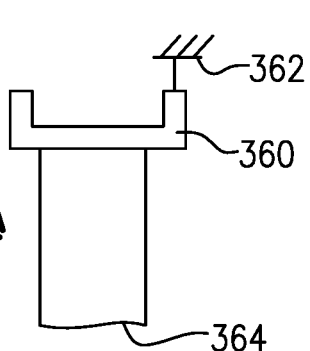
FIG. 5A is a schematic side view of a cantilevered stator vane.
Figure 5B:
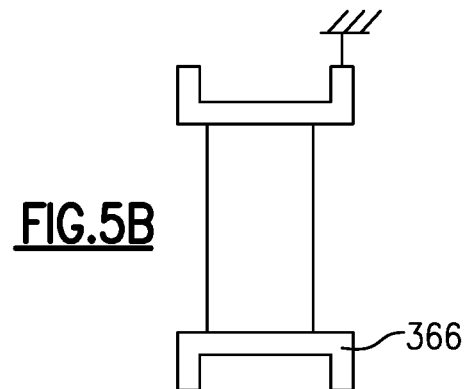
FIG. 5B is a schematic side view of a stator vane with an inner diameter shroud.
Figure 5C:
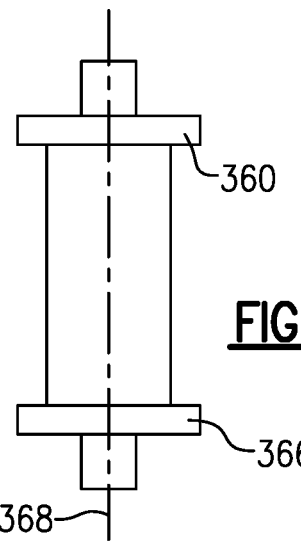
FIG. 5C is a schematic side view of an adjustable inlet guide vane.
Figure 9A:
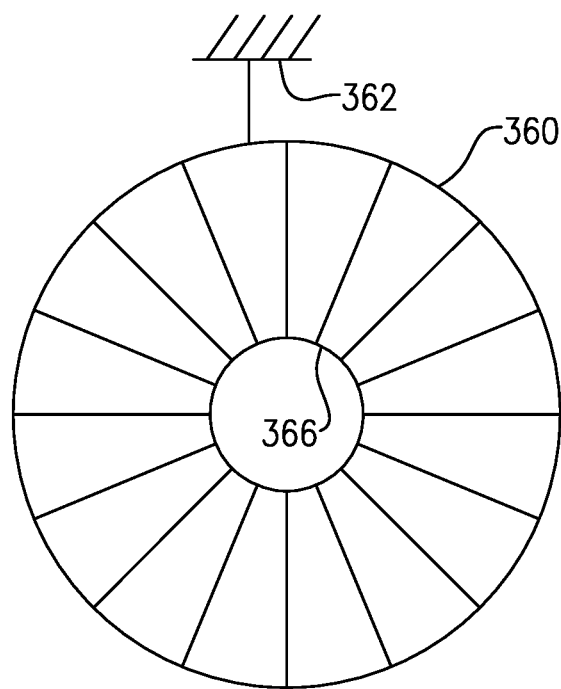
FIG. 9A is a front view of a circumferential array of stator vanes.
Figure 9B:
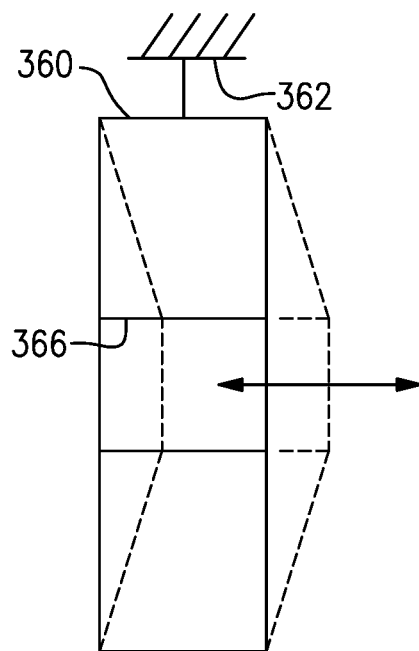
FIG. 9B is a side view of the array of FIG. 9A with an axial vibrational extreme shown in broken lines.

The fan blades 342 include roots (not shown) that are received in a slotted hub 337 (FIG. 3). In the example compressor section 324, the blades in the LPC 338 and HPC 352 are integrally bladed rotors (FIG. 4A) in which the airfoils are integrally formed with the rotor as a unitary structure, rather than rooted blades (FIG. 4B) that are received in correspondingly shaped slots in a rotor. The stator vanes in the compressor section 324 are cantilevered (FIG. 5A) such that each airfoil extends radially inward from an outer shroud 360 supported by an outer case 362 to a tip 364 that is supported by a potting material within an inner diameter ring (not shown). The eighth stage HPC stator 352p may be a "ringed" stator (e.g., "ring-strut-ring"; FIGS. 5B and 9A-9B) array in which an inner shroud 366 also is provided at an inner diameter of the airfoils, to be joined to one another. The IGV 343 is pivotally supported by the inner and outer shrouds 360, 366 for rotation about a generally radially oriented axis 368 (FIG. 5C).

The airfoil may be formed using any suitable process, for example, casting, forging and/or machining. Any suitable material can be used to provide the airfoil and may be determined based upon factors such as airfoil stresses, engine operating speeds, gas flow dynamics and operating temperatures. In one example, airfoils in the fan section are constructed from an aluminum-based alloy, airfoils in the low pressure compressor section are constructed from an aluminum-based alloy, and airfoils in the high pressure compressor section are constructed from a nickel-based superalloy. One example aluminum-based alloy is 7075 with a density of about 0.103 lb/in$^3$ (2.85 g/cm$^3$) and a modulus of elasticity of about 10.4 Mpsi (71 GPa) at room temperature. One example titanium-based alloy is Ti-6Al-4V, which has a density of about 0.16 lb/in$^3$ (4.4 g/cm$^3$) and a modulus of elasticity of about 16-17 Mpsi (110-117 GPa) at room temperature. Example nickel-based superalloys are Inconel 718 and ME 16. These nickel-based superalloys have a density of approximately 0.3 lb/in$^3$ (8.3 g/cm$^3$), and more broadly 0.28-0.32 lb/in$^3$ (7.7-8.9 g/cm$^3$). In addition, the nickel-based superalloy material has a modulus of elasticity of approximately 30 Mpsi (206 GPa), and more broadly 27-36 Mpsi (186-248 GPa) at room temperature. The airfoils may also have a coating system.

A resonant condition is where a frequency of the excitation coincides with a frequency of the airfoil, and may result in high vibratory stress. The airfoil has a number of frequencies that can be resonant at various speeds. There are various modes of vibration, each with its associated natural frequency. As for airfoils, generally six vibratory modes primarily reflect how the airfoils interact with each other, and with other components of the engine. The type (EB, T, SWB, CWB, ND) and number (1, 2, 3, etc.) of the various modes may be ordered interchangeably through this disclosure (e.g., 1EB is the same as EB1).

A first type of mode is easywise bending (EB). An airfoil can be approximated as a cantilevered beam extending in the radial direction for the engine. The easywise bending is parallel to the shortest dimension, or in the thickness direction T.

FIGS. 6A-6E illustrate various easywise bending modes. FIG. 6B shows bi-directional movement in the direction 520 with a neutral condition that is, without deflection, shown in solid lines. FIG. 6B also shows one of two extremes, that is, with relatively extreme deflection in broken lines. FIG. 6A is a plan view of the airfoil, illustrating node line 522, which is the location of each node in cross sections of the airfoil having deflections illustrated in FIG. 6C. FIG. 6C shows both extremes of EB1 (1EB) movement in broken lines. A first EB mode (EB1 or 1EB; FIG. 6C) is the EB mode of lowest frequency. A second EB mode (2EB or EB2; FIG. 6D) deflection, is a mode that encompasses two node lines 522A and 522B. The mode has one portion of the airfoil moving toward the pressure side and another toward the suction side, changing direction for each cycle of vibration. Note there is no corresponding plan view illustrating the node lines 522A and 522B, though the locations of the two horizontal node lines relative to the airfoil height is readily apparent. EB3 or 3EB (FIG. 6E) is a further EB mode and illustrates three node lines 522A, 522B, and 522C. Other EB modes may exist, and the mode number is indicated by the numeral following "EB."

The twist or torsion (T) modes (FIGS. 7A and 7B) involve bi-directional twist in direction 540 twist generally about a spanwise axis for the airfoil, which is a radial axis from the center of the airfoil, or node line 542. As with FIG. 6B, one torsional extreme is shown in broken lines with the neutral, deflection free condition shown in solid lines as shown in FIG. 7B. As with EB and other modes, there are a series of torsion modes, including 1T (T1), 2T (T2), etc.

The stiffwise bending (SWB) modes (FIGS. 8A and 8B) are generally normal to the EB modes in the chordwise direction H such that the corners of the airfoil tip at the leading and trailing edges remain in-plane. The SWB resonance frequencies will be higher than the corresponding EB resonance frequencies. As with FIG. 6B, FIG. 8B shows bi-directional movement in a direction 530 with one extreme (a trailing-edge shifted extreme) shown in broken lines relative to a solid line neutral position. The node line is shown as 532. As with EB and other modes, there are a series of stiffwise bending modes, including 1SWB (SWB1), 2SWB (SWB2), etc.

There are other modes as well. The chordwise bending (CWB) mode are where the corners of the airfoil tip at the leading and trailing edges vibrate out-of-plane in the same direction at the same time. As with EB and other modes, there are a series of chordwise bending modes, including 1CWB (CWB1), 2CWB (CWB2), etc. Trailing edge bending (TEB) modes are bending modes that bend primarily along the trailing edge, and leading edge bending (LEB) modes are bending modes that bend primarily along the leading edge. Some modes may be a more complex combination of bending and torsion such that the complex mode (M) cannot be characterized as one mode. In another example, a nodal diameter (ND) bending mode (FIGS. 9A and 9B) has movement in an axial direction. Since one of the inner and outer platforms 360, 362 of the stator vanes are fixed to the outer case 362, the joined inner shrouds 366 can vibrate in unison axially forward and aft in a zero nodal diameter (ND0 or 0ND). Another type of nodal diameter is referred to as an aliased nodal diameter, which corresponds to the upstream blade count minus the stator count of the stage in question. In one example, for a stage with 117 stator vanes with sixty-six upstream blades in the adjacent stage, the aliased nodal diameter is fifty-one (ND51 or 51ND). In this aliased nodal diameter, there are fifty-one peaks/troughs vibrating in the radial direction at each of the inner and outer diameters of the stator stage. In the case of stator vanes, where the presence of the shroud has a significant impact on the vibrational mode, the mode in Table 1 also includes the designation -SH. As a general matter, however, the lowest resonance frequency is expected to be that of the EB1 mode. The remaining details of airfoil configuration may influence the relative positioning of the remaining modes.

Figure 10:
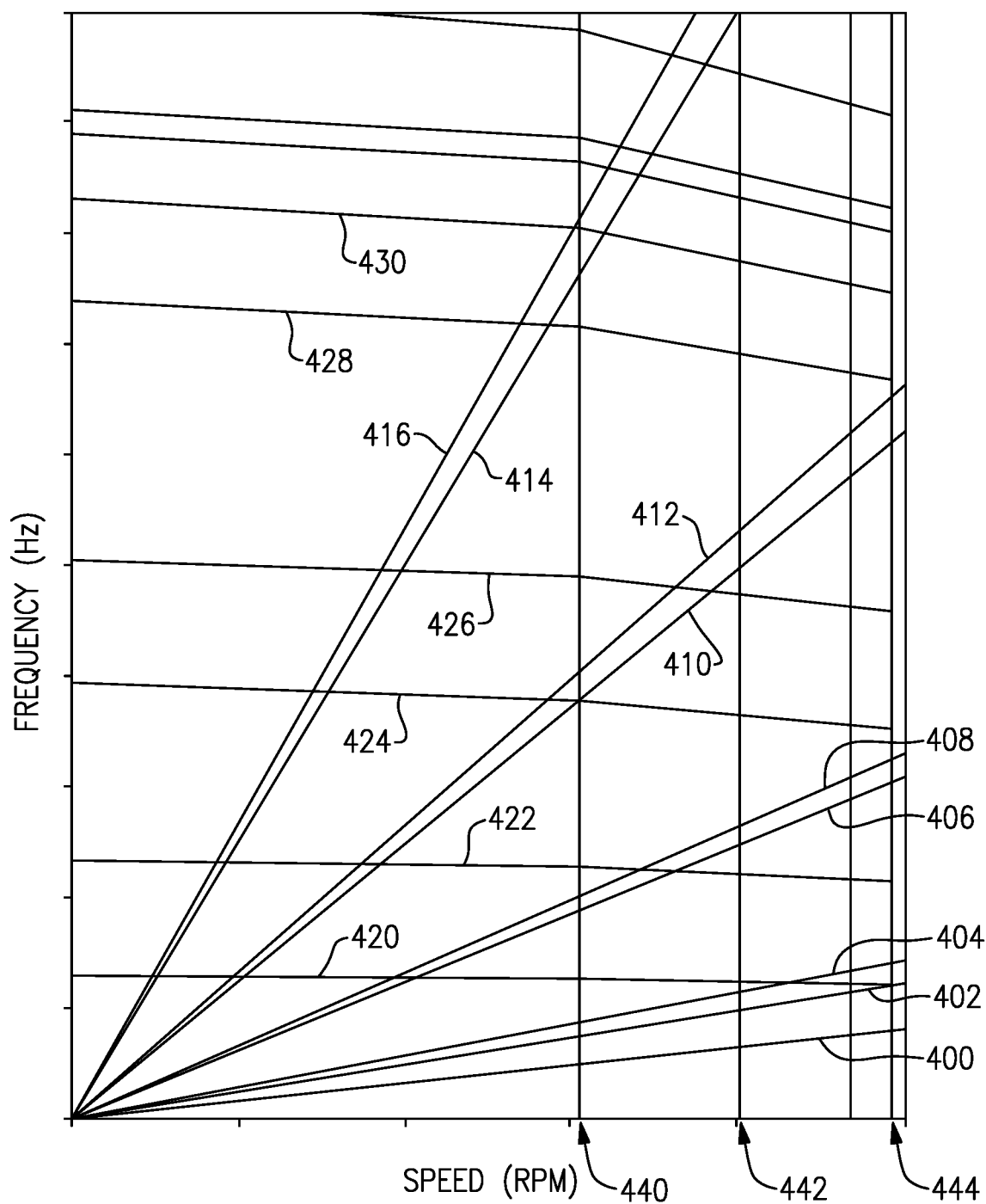
FIG. 10 is a Campbell diagram of an airfoil.

Table I below and FIG. 10 provide parameters of the particular resonance profile:

TABLE I

| Mode | Zero Speed Nominal Freq. (Hz) | Idle Nominal Freq. (Hz) @ speed range (rpm) | Min Cruise Nominal Freq. (Hz) @ speed range (rpm) | Redline Nominal Freq. (Hz) @ speed range (rpm) |
| --- | --- | --- | --- | --- |
| 1EB | 703 | 703 | 682 | 682 |
| 1EB/1T | 3574 | 3574 | 3468 | 3468 |
| 2T | 8100 | 8100 | 7860 | 7860 |
| 4EBTE | 9450 | 9450 | 9169 | 9169 |
| 1CWB | 11116 | 11116 | 10786 | 10786 |
| 2CWB | 11620 | 11620 | 11275 | 11275 |

The above frequencies relate primarily to the airfoils. The frequencies also include the effects of a root, platform, rim, disk and/or rotor. In the case of a stator vane, where the effects of the shroud have an appreciable effect, "-SH" is indicated under "Mode" in the tables. In the case of an array with an asymmetrical arrangement of airfoils, the above frequencies represent an average of the frequencies of the different airfoils. Tolerance for the nominal frequencies around these nominal values at each of these speeds is ±10%, more narrowly, ±5%. Exemplary zero speed frequencies are at ambient conditions (e.g., 20-28° C.). For the engine using this airfoil element, exemplary running speeds for the low spool 330 are: idle speed is 1500-1800 rpm; min. cruise speed is 7700-8600 rpm; and redline speed is 9500-10600 rpm.

While frequencies are a function of the airfoil length, stiffness, and mass, they also represent the unique design characteristic of the airfoil. During the airfoil design, the resonance frequencies may be modified by selective modification of the airfoil root stiffness, length, chord, external thickness, or internal features (such as but not limited to rib location/thickness, or wall thickness, etc.). Any changes to the resonance frequencies could render the airfoil unacceptable for continued operation in the field without high vibratory stresses which can result in high cycle fatigue cracking. One skilled in vibration analysis and design would understand that these resonance frequency characteristics are unique for each airfoil and should account for, for example, the specific operational vibratory environment. The frequencies are determined using computer modelling, for example, ANSYS, although the frequencies may be measured experimentally.

FIG. 10 is a Campbell diagram, with frequency and rotational speed on the axes, which plots the resonant frequencies for the airfoil against engine rotor speed. That is, the Campbell diagram illustrates the unique frequency characteristics of the airfoil and captures the vibratory resonance of the airfoil. The modal frequencies change with speed because of the increased temperature (reducing frequency) and centrifugal stiffening (increasing the frequency). The frequencies (which, as indicated, are unique for each airfoil) are represented by essentially horizontal lines 420, 422, 424, 426, 428, and 430. These illustrate, against the engine rotor speed, the frequency of the 1st easy-wise bending (1EB), 1st stiff-wise bending (SWB), 1st torsion (1T), 2nd easy-wise bending (2EB), 2nd torsion (2T), and 2nd trailing edge bending (2TEB) vibratory modes, or any other modes relevant to the airfoil, for example, summarized in Table I. However, the sequence of the modes or type of mode varies and may be different for each airfoil. The Campbell diagram has angled lines 400, 402, 404, 406, 408, 410, 412, 414, and 416. These angled lines, called excitation orders, represent the excitation from upstream and downstream stationary airfoils or other interruptions in the flowpath that the airfoil feels as it rotates past the stationary airfoils.

For example, lines 400, 402, and 404 may be components of a once per revolution excitation. The airfoils can feel this excitation for excitation orders 1E, 2E, 3E, 4E, and 5E. Lines 400, 402, and 404, represent 4E, 6E, and 7E, respectively. In any flowpath, there are general aerodynamic disturbances which the airfoils feel at multiples of the rotor spin frequency. 1E is one excitation per revolution or the rotor spin frequency (in cycles per second). The airfoils feel multiples of this once per revolution.

As illustrated for the airfoil, the 6E (402), and 7E (404) excitation orders are plotted on the Campbell diagram and are a potential concern because there are resonance crossings with the first bending mode (line 420) at high speed. The 4E line (line 400) does not have a crossing and is of less significance.

In addition, lines 410 and 412 respectively are excitation functions that are proportional to the vane counts of the vane stages immediately upstream and downstream of the airfoil stage in question. Lines 414 and 416 are twice 410 and 412 excitations and are relevant to Fourier decomposition of excitations. Lines 406 and 408 are proportional to counts of downstream struts (which are big structural airfoils that are part of the bearing supports; in this example, the strut count is different on two halves of the engine circumference).

Where the resonance frequency lines (represented by lines 420, 422, 424, 426, 428, and 430) intersect the excitation lines (represented by the angled lines 400, 402, 404, 406, 408, 410, 412, 414, and 416) a resonant condition occurs, which, as indicated, may result in high vibratory stress. The present airfoil characteristics have been designed such that vibratory modes, which may result in high vibratory stresses at a resonant condition, are avoided. Accordingly, the modes do not occur in the normal engine operating speed range (near idle (line 440)) and between minimum engine cruise (line 442) and redline (line 444). Vibratory modes, which are not predicted to have a high resonance response, are allowed to have a resonance condition in the normal operating range. As indicated, these evaluations may account for some or more of flowpath temperature and pressure, airfoil length, speed, etc. As a result, the evaluation and the subsequent iterative redesign of the airfoil is an airfoil which is unique for a specific engine in a specific operating condition.

During the design, the airfoil must be tuned such that the resonance points do not occur in the operating speed range of the engine for critical modes. To tune the airfoil, the resonance frequency must be changed, for example, by varying the airfoil length thickness, moment of inertia, or other parameters. These parameters are modified until the graphical intersections representing unwanted resonance occur outside the operating speed range, or at least outside key operating conditions within the operating speed range. This should be done for each the first four (or more) vibratory modes of the airfoil (1EB, 1T, 1CWB, 1SWB), and the airfoil should be tuned for varying excitation sources.

In FIG. 10, the idle speed is shown as 440, the minimum cruise speed is shown as 442, and the redline speed is shown as 444. Idle speed is important because the engine spends much time at idle. Tuning out resonance at min cruise and redline speeds are important because engines typically cannot avoid these speeds. A resonance at an excitation frequency at an intermediate speed may be avoided by slightly increasing or decreasing speed.

As an example from FIG. 10, it is seen that there are two resonance conditions. That is, the 1st stiff-wise bending resonance mode (line 422) crosses two excitation lines, which are lines 406 and 408. These two resonance conditions occur between the engine idle speed (line 440) and the engine minimum cruise speed (line 442). It should be understood that regardless of the particular mode, it is desirable to design an airfoil that at least avoids resonance at speed lines 440 and 442. Resonance between lines 440 and 442 is an acceptable location for a resonance to occur and is unique for this airfoil in this engine.

The disclosed airfoil is subject to damage from wear and foreign object debris (FOD) during engine operation. Pieces of the airfoil may be broken off, for example, from the tip, leading edge and/or trailing edge resulting in an altered or unrestored mode resonance frequency for the airfoil, which deviates from at least one of the desired mode resonance frequencies indicated in the Table(s). One or more repair procedures are employed (e.g., welding a piece onto the airfoil and/or machining a grafted piece) to repair the airfoil and restore the geometry and integrity of the airfoil. The repair procedure restores the unrestored mode resonance frequency to again correspond to the desired mode resonance frequencies indicated in the Table(s).

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A turbomachine airfoil element comprising:
   an airfoil having pressure and suction sides spaced apart from one another in a thickness direction and joined to one another at leading and trailing edges, the airfoil extending in a radial direction of a span that is in a range of 2.59-2.89 inch (65.7-73.3 mm);
   a chord length extending in a chordwise direction from the leading edge to the trailing edge at 50% of the span is in a range of 1.46-1.76 inch (37.1-44.7 mm); and
   at least two of:
   a first mode has a frequency of 703 up to ±10% Hz;
   a second mode resonance frequency is 3574 up to ±10% Hz;
   a third mode has a frequency of 8100 up to ±10% Hz;
   a fourth mode has a frequency of 9450 up to ±10% Hz;
   a fifth mode has a frequency of 11116 up to ±10% Hz; and
   a sixth mode has a frequency of 11620 up to ±10% Hz;
   wherein the frequencies are at a zero speed and ambient conditions, and the frequency of any given mode does not exceed the frequency of a higher order mode;
   wherein the first mode is a 1EB mode, the second mode is a 1EB/1T mode, the third mode is a 2T mode, the fourth mode is a 4EBTE, the fifth mode is a 1CWB mode, and the sixth mode is a 2CWB mode, the 1EB and 4EBTE mode corresponds to deflections substantially parallel to thickness direction, the 1T and 2T modes correspond to twisting about the radial direction, and the CWB modes correspond to bending that is substantially normal to the thickness direction and substantially along the chordwise direction;
   wherein the airfoil is part of a stator vane having opposing ends supported by potting;
   wherein the airfoil is an aluminum-based alloy, the aluminum-based alloy has a density of about 0.103 lb/in$^3$ (2.85 g/cm$^3$), the aluminum-based alloy has a modulus of elasticity of about 10.4 Mpsi (71 GPa) at room temperature.

2. The element of claim 1, wherein three of the first, second, third, fourth, fifth and sixth mode frequencies are present.

3. The element of claim 1, wherein at a minimum cruise speed of 7700-8600 rpm at Mach 0.8 at 35,000 feet:
   the first mode has a frequency of 682 up to ±10% Hz;
   the second mode has a frequency of 3468 up to ±10% Hz;
   the third mode has a frequency of 7860 up to ±10% Hz;
   the fourth mode has a frequency of 9169 up to ±10% Hz;
   the fifth mode has a frequency of 10786 up to ±10% Hz; and
   the sixth mode has a frequency of 11275 up to ±10% Hz.

4. The element of claim 1, wherein the frequencies are up to ±5% Hz.

5. A method of repairing an airfoil comprising the steps of:
   providing an airfoil having pressure and suction sides spaced apart from one another in a thickness direction and joined to one another at leading and trailing edges, the airfoil extending in a radial direction of a span that is in a range of 2.59-2.89 inch (65.7-73.3 mm), and a chord length extending in a chordwise direction from the leading edge to the trailing edge at 50% of the span is in a range of 1.46-1.76 inch (37.1-44.7 mm), wherein the provided airfoil has at least one unrestored mode frequency that is attributable to damage to the airfoil; and
   repairing the airfoil to provide at least two of:
   a first mode has a frequency of 703 up to ±10% Hz;
   a second mode resonance frequency is 3574 up to ±10% Hz;
   a third mode has a frequency of 8100 up to ±10% Hz;
   a fourth mode has a frequency of 9450 up to ±10% Hz;
   a fifth mode has a frequency of 11116 up to ±10% Hz; and
   a sixth mode has a frequency of 11620 up to ±10% Hz;
   wherein at least one of the first mode frequency, second mode frequency, third mode frequency, fourth mode frequency, fifth mode frequency, and sixth mode frequency corresponds to a restored mode frequency that supersedes the unrestored mode frequency;
   wherein the frequencies are at a zero speed and ambient conditions, and the frequency of any given mode does not exceed the frequency of a higher order mode;
   wherein the first mode is a 1EB mode, the second mode is a 1EB/1T mode, the third mode is a 2T mode, the fourth mode is a 4EBTE, the fifth mode is a 1CWB mode, and the sixth mode is a 2CWB mode, the 1EB and 4EBTE mode corresponds to deflections substantially parallel to thickness direction, the 1T and 2T modes correspond to twisting about the radial direction, and the CWB modes correspond to bending that is substantially normal to the thickness direction and substantially along the chordwise direction;
   wherein the airfoil is part of a stator vane having opposing ends supported by potting;
   wherein the airfoil is an aluminum-based alloy, the aluminum-based alloy has a density of about 0.103 lb/in$^3$ (2.85 g/cm$^3$), the aluminum-based alloy has a modulus of elasticity of about 10.4 Mpsi (71 GPa) at room temperature.

6. A turbofan engine comprising:
   a fan section;
   a compressor section arranged fluidly downstream from the fan section;
   a turbine section arranged fluidly downstream from the compressor section;
   a combustor arranged fluidly between the compressor and turbine sections; and
   an airfoil in at least one of the fan, compressor and turbine sections, the airfoil having:
   pressure and suction sides spaced apart from one another in a thickness direction and joined to one another at leading and trailing edges, the airfoil extending in a radial direction of a span that is in a range of 2.59-2.89 inch (65.7-73.3 mm);
   a chord length extending in a chordwise direction from the leading edge to the trailing edge at 50% of the span is in a range of 1.46-1.76 inch (37.1-44.7 mm); and
   at least two of:
   a first mode has a frequency of 703 up to ±10% Hz;
   a second mode has a frequency of 3574 up to ±10% Hz;

a third mode has a frequency of 8100 up to ±10% Hz;
a fourth mode has a frequency of 9450 up to ±10% Hz;
a fifth mode has a frequency of 11116 up to ±10% Hz; and
a sixth mode has a frequency of 11620 up to ±10% Hz;
wherein the frequencies are at a zero speed and ambient conditions, and the frequency of any given mode does not exceed the frequency of a higher order mode;
wherein the first mode is a 1EB mode, the second mode is a 1EB/1T mode, the third mode is a 2T mode, the fourth mode is a 4EBTE, the fifth mode is a 1CWB mode, and the sixth mode is a 2CWB mode, the 1EB and 4EBTE mode corresponds to deflections substantially parallel to thickness direction, the 1T and 2T modes correspond to twisting about the radial direction, and the CWB modes correspond to bending that is substantially normal to the thickness direction and substantially along the chordwise direction;
wherein the airfoil is provided in the compressor section, the compressor section includes a high pressure compressor fluidly downstream from a low pressure compressor, the airfoil is in the low pressure compressor, the low pressure compressor includes three stages, the airfoil is part of a stator vane having opposing ends supported by potting;
wherein the airfoil is an aluminum-based alloy, the aluminum-based alloy has a density of about 0.103 lb/in$^3$ (2.85 g/cm$^3$), the aluminum-based alloy has a modulus of elasticity of about 10.4 Mpsi (71 GPa) at room temperature.

\* \* \* \* \*